United States Patent [19]
Xuan

[11] Patent Number: 4,563,604
[45] Date of Patent: Jan. 7, 1986

[54] ELECTROMAGNETIC STEPPING MOTOR WITH TWO COUPLED ROTORS

[75] Inventor: Mai T. Xuan, Chavannes, Switzerland

[73] Assignee: Omega SA, Bienne, Switzerland

[21] Appl. No.: 649,347

[22] Filed: Sep. 11, 1984

[30] Foreign Application Priority Data

Sep. 16, 1983 [CH] Switzerland ............... 5049/83

[51] Int. Cl.⁴ ............................................. H02K 37/00
[52] U.S. Cl. ........................... 310/49 R; 310/40 MM; 310/114; 310/156
[58] Field of Search ............. 310/40 MM, 49 R, 114, 310/156, 162, 165, 163, 164, 216, 83, 179; 368/157, 160, 161, 162

[56] References Cited

U.S. PATENT DOCUMENTS

| | | | |
|---|---|---|---|
| 1,734,941 | 11/1929 | Cowles | 310/163 |
| 3,757,149 | 9/1973 | Holper | 310/114 |
| 3,863,084 | 1/1975 | Hasebe | 310/114 |

FOREIGN PATENT DOCUMENTS

| | | | |
|---|---|---|---|
| 0116577 | 7/1982 | Japan | 310/49 R |
| 0012561 | 1/1983 | Japan | 310/40 MM |

Primary Examiner—R. Skudy
Attorney, Agent, or Firm—Griffin, Branigan & Butler

[57] ABSTRACT

The electromagnetic stepping motor of the invention comprises two rotors coupled to a common transmission wheel. The magnetic circuit of the stator is arranged so as to subject the respective rotors to fluxes of opposite senses $\phi_1$, $\phi_2$ when the winding is energized. The magnetization sense of the first rotor is opposite to the magnetization sense of the second rotor in a manner such that they turn in the same sense when subjected to said opposite sense fluxes. This arrangement permits either a diminution of the volume or a decrease in energy consumption of the motor and at the same time increases the security of running thereof in the presence of external magnetic fields. Such a motor is particularly adapted to small volume horological applications.

4 Claims, 3 Drawing Figures

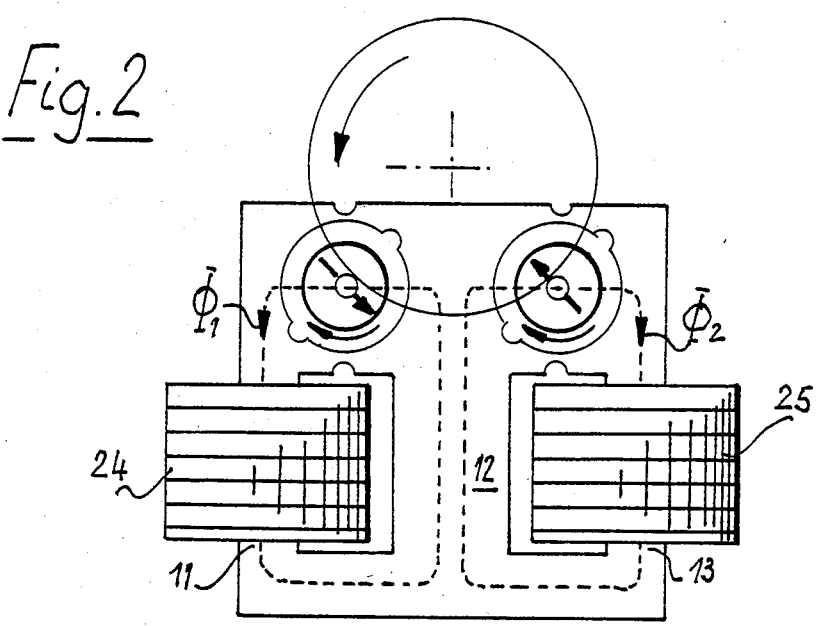
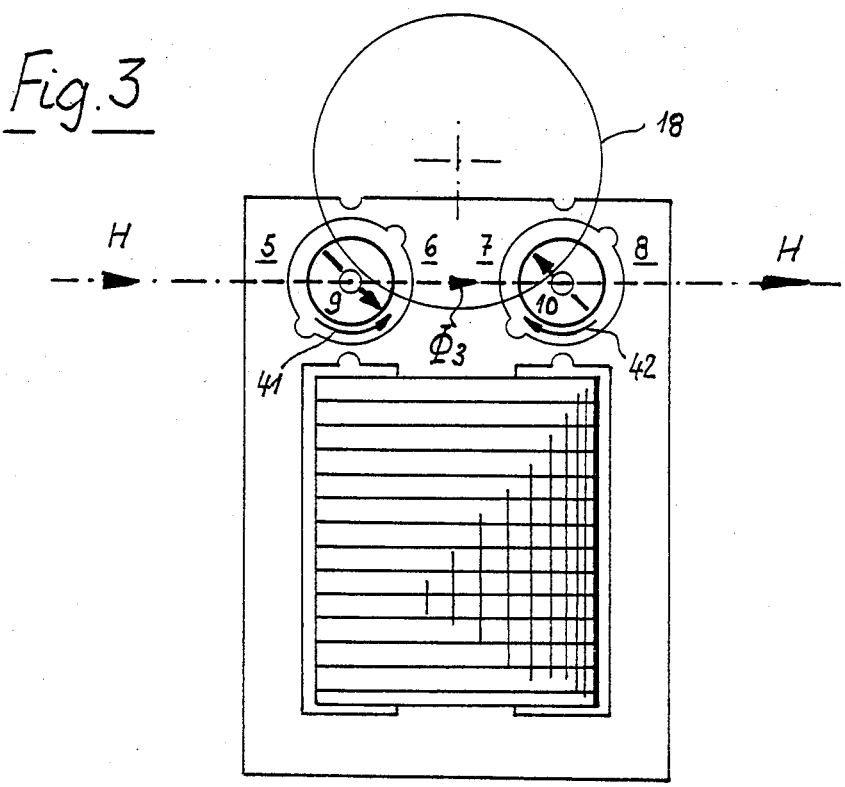

ELECTROMAGNETIC STEPPING MOTOR WITH TWO COUPLED ROTORS

This invention concerns a single phase electromagnetic stepping motor for timepiece applications comprising a stator, at least one energizing winding mounted on core means associated with said stator, a pair of openings cut into the stator, each exhibiting two polar expansions and a rotor placed in each of the said openings so as to be subjected to flux generated by said winding, said rotors each being formed by a diametrically magnetized permanent magnet and each bearing a pinion meshing with a transmission wheel common to both.

BACKGROUND OF THE INVENTION

A motor corresponding to the basic definition given above is known from the published specification JP-A No. 57 116 577. In this publication, the stator and core are shown in the form of a U. The energizing winding is placed on one of the legs of the U and in the lower part thereof. Two pairs of polar expansions are formed respectively on the upper legs of the U. Each pair of polar expansions encompasses a rotor formed by a permanent magnet diametrically magnetized. Each rotor meshes with a common transmission wheel through means of pinions associated with each of the rotors. With such construction the cited publication aims at a motor either of reduced dimensions or reduced energy consumption.

In order to understand this, it will be here recalled that the mutual couple magnet-winding Cab developed by the motor is proportional to the product of the mutual flux $\phi_{ab}$ due to the magnet and the number of ampere-turns N·I due to the winding where N is the number of turns in the winding and I the current circulating therein. It will thus be written:

$$Cab \cong \phi_{ab} \cdot N \cdot I.$$

With constant current, in order to reduce the dimensions of the winding and thus of the motor, one diminishes the number of turns N but at the same time as shown by the equation above it will be necessary to increase the value of the flux $\phi_{ab}$ should one wish to maintain the same mutual couple Cab. In the cited publication, this increase of flux is realized through the use of two rotors. If each of the magnets comprising the rotors develops a flux $\phi_{ab}$ it will then be possible to reduce by half the number of turns in the winding according to the equation $$Cab \cong 2\phi_{ab} \cdot N/2 \cdot I.$$

In the same manner and starting with the same arrangement, should it be desired to reduce the motor energy consumption, the current must be reduced by half, thus:

$$Cab \cong 2\phi_{ab} \cdot N \cdot I/2.$$

In both of these cases, it will be observed however that diminishing the volume or the current consumption must be compensated by the diminishing of the number of ampere-turns developed by the winding or if one wishes by the diminishing of the magnetic induction created by the number of ampere-turns. This however will not take place without having an unfavourable influence on the security of operation of the motor which will thus be far more sensitive to magnetic induction resulting from fields external to the timepiece.

An electromagnetic stepping motor of the classical type with a single rotor and equipping a watch is normally provided with a rare earth magnet which develops in the air gap a magnetic induction of the order of 0.25 tesla. The winding of such motor if the number of ampere-turns in the moving operation is on the order of 3 amperes will develop a magnetic induction only of the order of $10 \cdot 10^{-4}$ tesla. This latter value is equivalent to the induction resulting from external magnetic fields which may either block the motor or cause it to accelerate. In a motor having two rotors, as described hereinabove, the induction due to the magnets will go to 0.5 T while that due to the winding will be reduced to $5 \cdot 10^{-4}$ T should one wish to benefit from the mentioned advantages. This type of motor will thus be twice as sensitive to external magnetic fields.

To overcome this difficulty, it has already been proposed to protect a standard motor having a single rotor by means of magnetic shields which will channel the disturbing fields outside the magnetic circuit of the stator. In the case of a motor having two rotors, one might well propose the same solution. However, the advantages sought for will be lost since such shieldings are voluminous, expensive and difficult to manufacture.

SUMMARY OF THE INVENTION

The present invention proposes a new arrangement of a stepping motor having two rotors which without requiring magnetic shieldings, will be insensitive to disturbing external magnetic fields and to this effect provides a single phase electromagnetic stepping motor for timepiece applications comprising a stator, at least one energizing winding mounted on core means associated with said stator, a pair of openings cut into the stator each exhibiting two polar expansions and a rotor placed in each of the said openings so as to be subjected to flux generated by said winding, said rotors each being formed by a diametrally magnetized permanent magnet and each bearing a pinion meshing with a transmission wheel common to both, said stator being arranged and adapted to subject a first of said rotors to a flux $\phi_1$ essentially opposite to the flux $\phi_2$ applied to the second rotor when said winding is energized, the magnetization sense of said first rotor being opposite to the magnetization sense of the second rotor so that they rotate in the same sense when subjected to fluxes of opposed senses.

BRIEF DESCRIPTION OF THE DRAWINGS

FIG. 2 is a schematic representation of the motor according to the invention and in accordance with a second form thereof.

FIG. 3 shows the motor of FIG. 1 subjected to disturbing magnetic fields in accordance with the magnetic axis of the poles.

DETAILED DESCRIPTION OF THE INVENTION

Figure 1:
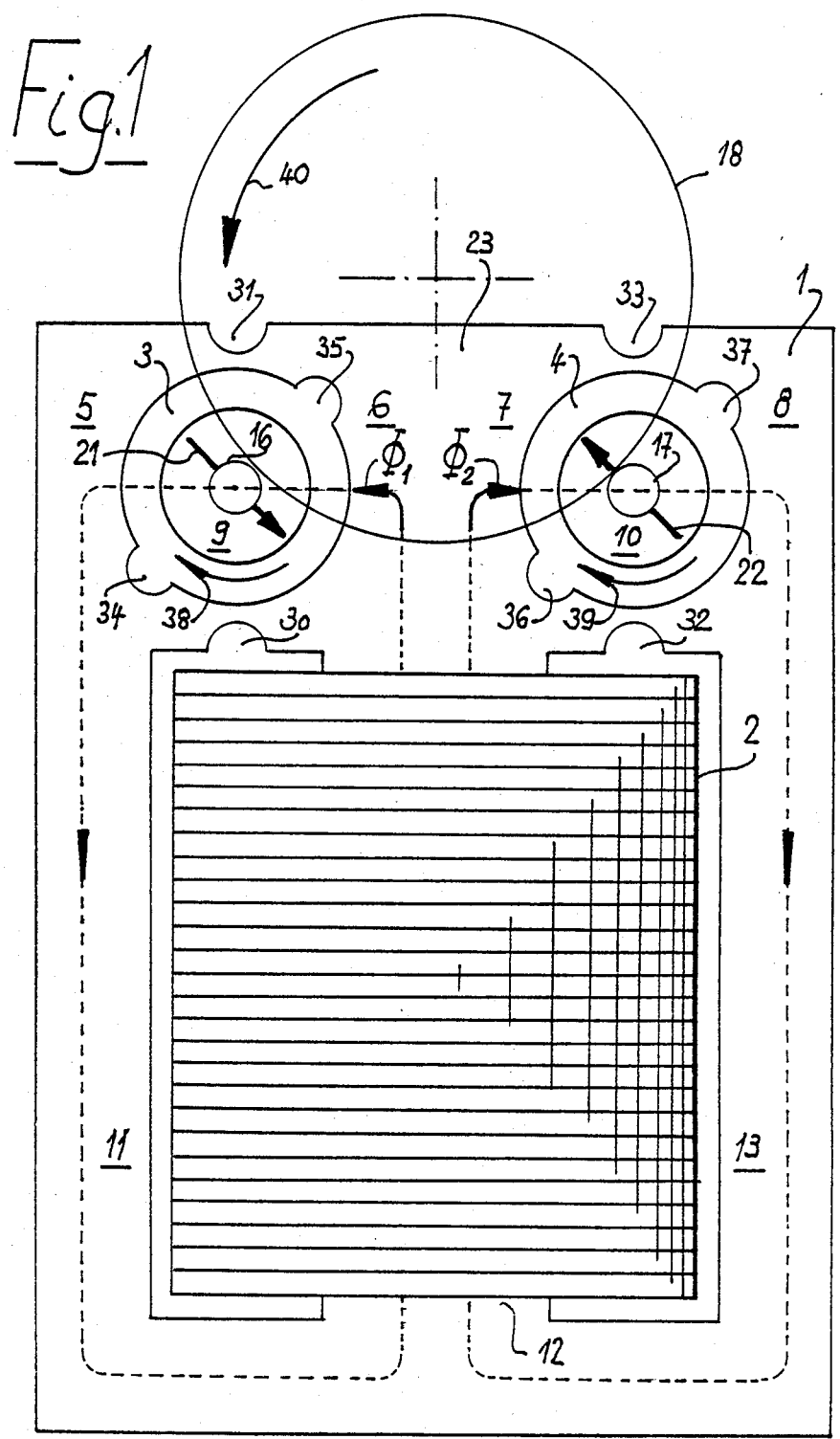
FIG. 1 is a schematic representation of the motor according to the invention and according to a first form thereof.

The electromagnetic motor shown in FIG. 1 comprises a stator 1 with which is associated a core 12 on which is placed an energizing winding 2. In the stator 1 are cut out two openings 3, 4, each defining a pair of poles 5, 6 and 7, 8 respectively. Pole 5 is separated from pole 6 by saturable necks 30 and 31; pole 7 is separated from pole 8 by saturable necks 32 and 33 as well known from the state of the art. These necks may be replaced by air gaps. The openings 3 and 4 are provided with notches 34, 35 and 36, 37 which define a rest position for the rotors. A rotor 9 is placed in opening 3 and a rotor 10 is placed in opening 4. These rotors comprise permanent magnets diametrically magnetized. Each rotor is provided with a pinion 16 and 17 respectively meshing with the same transmission wheel 18. Wheel 18 is adapted to drive the time display mechanism of the timepiece (not shown).

As will be seen on FIG. 1 and in accordance with the invention, the magnetic circuit of the stator (1, 11, 12, 13) is arranged in a manner to subject rotor 9 to a flux $\phi_1$ opposed to the sense of flux $\phi_2$ applied to rotor 10 when the energizing winding 2 is excited. In order that the rotors be driven in the same sense, it will be understood that the mutual phase spread of rotors 9 and 10 in respect of their magnetization sense is that shown on the figure by arrows 21 and 22. If one supposes for instance that a pulse applied to winding 2 causes pole pieces 6 and 7 to be north poles, it is necessary that the point of arrow 21 indicating the north of the magnet be directed to the bottom in order to drive rotor 9 in the sense of arrow 38 and in the same manner that the point of arrow 22 indicating the north pole of the magnet be directed upwards in order to drive the rotor 10 in the sense of arrow 39. The two rotors turning in the same sense then will transmit their couple to wheel 18 which will turn in the opposite sense 40. It is seen on FIG. 1 that the magnetization sense of the first rotor 9 is spread 180° relative to the magnetization sense of the second rotor 10. This spread is provided during the assembly of the respective rotors in their corresponding openings.

In order that the flux generated by the winding presents the opposed configuration as desired on each of the rotors the arrangement shown in FIG. 1 is preferred wherein the stator presents the aspect of the magnetic circuit of a transformer having three cores referenced 11, 12 and 13. Herein openings 3 and 4 are cut into one of the legs joining the three cores and the opening 3 is situated between core 11 and core 12 while opening 4 is situated between core 12 and core 13. Furthermore, in this variant only a single winding is placed on the central core 12.

FIG. 2 shows a second variant of the motor in accordance with the invention. In this arrangement, the magnetic circuit of the motor resembles the circuit of the motor discussed above. It exhibits however two windings 24 and 25 placed on cores 11 and 13. It is however evident that the winding sense is chosen in order to provide the same arrangement of opposed fluxes $\phi_1$ and $\phi_2$ as that which has been described in respect of FIG. 1.

The motors described in FIGS. 1 and 2 exhibit the same advantages of reduction of volume or diminishing of energy consumption as that provided in the publication JP-A No. 57 116 577 cited hereinabove since they permit, thanks to doubling of the magnet, to diminish by half the number of ampere-turns to be provided by the winding. An addition, the new configuration which the motors of FIGS. 1 and 2 present, particularly insofar as it concerns the division of magnetic flux due to the energizing winding, renders them insensitive to external magnetic fields. FIG. 3 shows why.

In FIG. 3 there has been shown schematically the motor of FIG. 1 subjected to a disturbing field H which acts along the magnetic axis of the poles 5, 6 and 7, 8.

The rotors 9 and 10 are thus subjected to flux $\phi_3$ which acts in the same sense on each of them. As the magnetization sense of rotors 9 and 10 is separated in phase by 180° it will be understood that rotor 9 will be urged in a first sense (arrow 41) and rotor 10 will be urged in a second sense (arrow 42) opposed to the first. Thus, the common transmission wheel which meshes with rotors 9 and 10 will receive two couples of opposite sense from whence there will result no rotation of the wheel 18.

In the case in which the disturbing magnetic field is exerted along an axis perpendicular to the magnetic axis of the poles, it will be understood that it will have very slight influence on the rotors since the flux produced will follow the direction of the cores without touching the regions in which the rotors are situated. Should the disturbing field be oblique, it will be resolved between a component in accordance with the magnetic axis of the poles and a component according to an axis perpendicular to the axis of the poles and will produce the same effects as those which have just been described.

To conclude what has just been explained it will be noted that the motor in accordance with the invention not only permits a reduction of the volume thereof or of the energy consumption, but at the same time proposes a transductor which is particularly insensitive to disturbing external fields and this without requiring protective magnetic screens. Relative to the publication cited hereinabove, the motor in accordance with the invention brings about a decisive improvement in respect of its security of operation. Effectively in the motor which forms the object of the publication the two rotors are subjected to a flux in the same sense whenever the winding is energized. It follows that a disturbing flux exerted in the axis of the poles will not fail to develop a disturbing couple in the same sense on each of the rotors which may have as a consequence the driving of the wheel meshing with said rotors.

I claim:

1. A single phase electromagnetic stepping motor for timepiece applications comprising a stator, at least one energizing winding mounted on core means associated with said stator, a pair of openings cut into the stator each exhibiting two polar expansions and a rotor placed in each of said openings so as to be subjected to flux generated by said winding, said rotors each being formed by a diametrally magnetized permanent magent and each bearing a pinion meshing with a transmission wheel common to both, said stator being arranged and adapted to subject a first of said rotors to a flux $\phi_1$ essentially opposite to the flux $\phi_2$ applied to the second rotor when said winding is energized, the magnetization sense of said first rotor being opposite to the magnetization sense of said second rotor in such a manner that said rotors rotate in the same sense when subjected to fluxes of opposed senses.

2. A single phase electromagnetic stepping motor as set forth in claim 1 wherein the stator exhibits the form of magnetic circuit of a three core transformer in which said openings are cut into one of the legs joining the three cores, a first of said openings being situated between a first and a second of said cores, the other said opening being situated between the second and the third of said cores.

3. A single phase electromagnetic stepping motor as set forth in claim 2 comprising a single winding mounted on the second of said cores.

4. A single phase electromagnetic stepping motor as set forth in claim 2 comprising two windings mounted respectively on the first and third of said cores.

* * * * *